United States Patent
Hoshino (10) Patent No.: US 8,031,173 B2
(45) Date of Patent: Oct. 4, 2011

(54) COMPUTER SWITCHING DEVICE, COMPUTER SWITCHING METHOD THEREFOR, PROGRAM THEREOF AND COMPUTER SYSTEM THEREOF

(75) Inventor: Tomonori Hoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 11/345,268

(22) Filed: Feb. 2, 2006

(65) Prior Publication Data

US 2006/0176293 A1    Aug. 10, 2006

(30) Foreign Application Priority Data

Feb. 9, 2005  (JP) ................. 2005-032406

(51) Int. Cl.
*G06T 1/00*      (2006.01)
(52) U.S. Cl. ..................................... 345/157
(58) Field of Classification Search .......... 345/629, 345/204, 157, 699, 3.4, 1.1, 156, 660, 698, 345/1.2, 689; 358/450
See application file for complete search history.

(56) References Cited

U.S. PATENT DOCUMENTS

| | | | | |
|---|---|---|---|---|
| 5,517,209 | A  * | 5/1996  | Holland et al. ............ | 715/788 |
| 6,226,105 | B1 * | 5/2001  | Fukushi ................... | 358/452 |
| 6,304,895 | B1 * | 10/2001 | Schneider et al. ......... | 709/203 |
| 7,420,548 | B2 * | 9/2008  | Kang ....................... | 345/204 |
| 7,596,645 | B1 * | 9/2009  | Hillebrand ............... | 710/62 |
| 2001/0055029 | A1 * | 12/2001 | Nakajima et al. ......... | 345/629 |
| 2002/0175924 | A1 * | 11/2002 | Yui et al. ................. | 345/660 |
| 2003/0001966 | A1 * | 1/2003 | Matsubara et al. ........ | 348/553 |
| 2003/0174161 | A1 * | 9/2003 | Wilburn et al. ........... | 345/730 |
| 2004/0027364 | A1 * | 2/2004 | Ohtani et al. ............. | 345/699 |
| 2004/0046707 | A1 * | 3/2004 | Mori et al. ............... | 345/1.1 |
| 2004/0130502 | A1 * | 7/2004 | Sato et al. ................ | 345/2.1 |
| 2004/0189598 | A1 * | 9/2004 | Fujita et al. .............. | 345/156 |
| 2005/0044236 | A1 * | 2/2005 | Stafford ................... | 709/227 |
| 2005/0174365 | A1 * | 8/2005 | Malmstrom .............. | 345/698 |
| 2005/0190148 | A1 * | 9/2005 | Fujita ...................... | 345/156 |

FOREIGN PATENT DOCUMENTS

| | | |
|---|---|---|
| JP | 6-325031 A | 11/1994 |
| JP | 2000-181599 A | 6/2000 |
| JP | 2002-055808 A | 2/2002 |
| JP | 2003-345730 A | 12/2003 |
| JP | 2004-120441 A | 4/2004 |
| WO | 01/52031 A1 | 7/2001 |

* cited by examiner

*Primary Examiner* — Quan-Zhen Wang
*Assistant Examiner* — Tony Davis
(74) *Attorney, Agent, or Firm* — Sughrue Mion, PLLC (57) ABSTRACT

The present invention provides a computer switching device that can easily monitor a plurality of computers for errors. A keyboard connection switch distributes the input operation information of keyboard over the plurality of computers in accordance with an instruction of a switching control device. A mouse connection switch distributes the input operation information of mouse over the plurality of computers in accordance with an instruction of the switching control device. A frame buffer buffers a screen from the VGA output of each computer. An image synthesis device forms an image by synthesizing the screens from the VGA outputs of the computers in accordance with an instruction of the switching control device.

2 Claims, 6 Drawing Sheets

COMPUTER SWITCHING DEVICE, COMPUTER SWITCHING METHOD THEREFOR, PROGRAM THEREOF AND COMPUTER SYSTEM THEREOF

BACKGROUND OF THE INVENTION

1. Field of the Invention

The present invention relates to a computer switching device, a computer switching method therefor, a program and a computer system thereof, and more particularly to a computer switching device installed in a server room and so on.

2. Description of the Prior Art

To reduce the installation space and cost of the device in the server room and so on, one keyboard, one mouse and one display are connected to a plurality of computers, employing a computer switching device called a KVM (Keyboard Video Mouse) switch (e.g., refer to Japanese Patent Laid-Open No. 2004-120441 and Japanese Patent Laid-Open No. 2003-345730).

This computer switching device has a switch, for example, any computer is connected to the keyboard, mouse and display in accordance with an operation of the keyboard and mouse, enabling a plurality of computers to be operated by one keyboard, one mouse and one display.

BRIEF SUMMARY OF THE INVENTION

However, since the conventional computer switching device can not monitor the VGA (Video Graphics Array) outputs of the plurality of computers concurrently, the operator may overlook the error information occurring in an interval of switching the screens, when the plurality of computers run a job in parallel, resulting in a severe problem.

That is, since the conventional computer switching device can not display the VGA outputs of the plurality of computers on a single display concurrently, the operator may often overlook the error, because all the screens can not be always monitored, even if an error and so on occurs in installing an OS (Operating System) or conducting various kinds of tests and so on, while multicasting the operation of keyboard and mouse for the plurality of computers.

Also, the conventional computer switching device can not multicast the mouse operation effectively, because the initial position of mouse for each computer is often different in multicasting the mouse operation.

Thus, it is an object of the invention to solve the above-mentioned problems, and to provide a computer switching device, a computer switching method, a program and a computer system in which a plurality of computers can be easily monitored for errors.

The present invention provides a computer switching device for use in a computer system composed of a plurality of computers having a display output and needing each input of a keyboard and a mouse, comprising means of forming a display screen by synthesizing the display outputs of the plurality of computers, wherein the display outputs of the plurality of computers are displayed concurrently on the display screen by contracting and moving the display outputs on the display screen.

Also, the invention provides a computer switching method for use with a computer switching device useful in a computer system composed of a plurality of computers having a display output and needing each input of a keyboard and a mouse, wherein the computer switching device performs a process of forming a display screen by synthesizing the display outputs of the plurality of computers, and the display outputs of the plurality of computers are displayed concurrently on the display screen by contracting and moving the display outputs on the display screen.

Also, the invention provides a program for a computer switching method for use with a computer switching device useful in a computer system composed of a plurality of computers having a display output and needing each input of a keyboard and a mouse, wherein the program enables a computer to perform a process of forming a display screen by synthesizing the display outputs of the plurality of computers, and to display the display outputs of the plurality of computers concurrently on the display screen by contracting and moving the display outputs on the display screen.

Further, the invention provides a computer system comprising a plurality of computers having a display output part, a keyboard input part and a mouse input part, a computer switching device for switching the input/output of the plurality of computers, and a display, a keyboard and a mouse connected to the computer switching device, wherein the computer switching device comprises a plurality of buffers for accumulating the output from the display output part of each of the plurality of computers, an image synthesis device for synthesizing the outputs from the plurality of buffers to be outputted onto the display, a keyboard connection switch for controlling the connection with the keyboard input part of each of the plurality of computers, a mouse connection switch for controlling the connection with the mouse input part of each of the plurality of computers, and a switching control device for controlling the keyboard connection switch based on the output from the keyboard and controlling the mouse connection switch based on the output from the mouse.

That is, the computer switching device of the invention multicasts the operation information of one keyboard and mouse to any number of computers out of the plurality of computers connected to the self device, and displays the VGA (Video Graphics Array) outputs of the plurality of computers on a single display, easily operating and monitoring the plurality of computers.

Also, the computer switching device of the invention has an initialization function of the mouse position, making the initial position of mouse in each computer to be operated identical, easily performing the mouse operation in multicasting.

More specifically, the computer switching device of the invention comprises means of distributing the input operation information of keyboard over the plurality of computers in accordance with an instruction of the switching control device, means of distributing the input operation information of mouse over the plurality of computers in accordance with an instruction of the switching control device, means of buffering the VGA output of each computer, means of forming an image by synthesizing the VGA outputs of the computers in accordance with an instruction of the switching control device, and means of controlling the computer switching device.

As described above, the computer switching device of the invention displays the VGA outputs of the plurality of computers on one display concurrently, easily monitoring the plurality of computers for errors.

Also, the computer switching device of the invention changes the brightness of the screen between the computer to be multicast and another computer, easily discriminating the computer to be multicast.

Moreover, the computer switching device of the invention can reset the mouse position, aligning the mouse positions of the plurality of computers, and easily performing the mouse operation by multicasting.

DETAILED DESCRIPTION OF THE PREFERRED EMBODIMENTS

Figure 1:
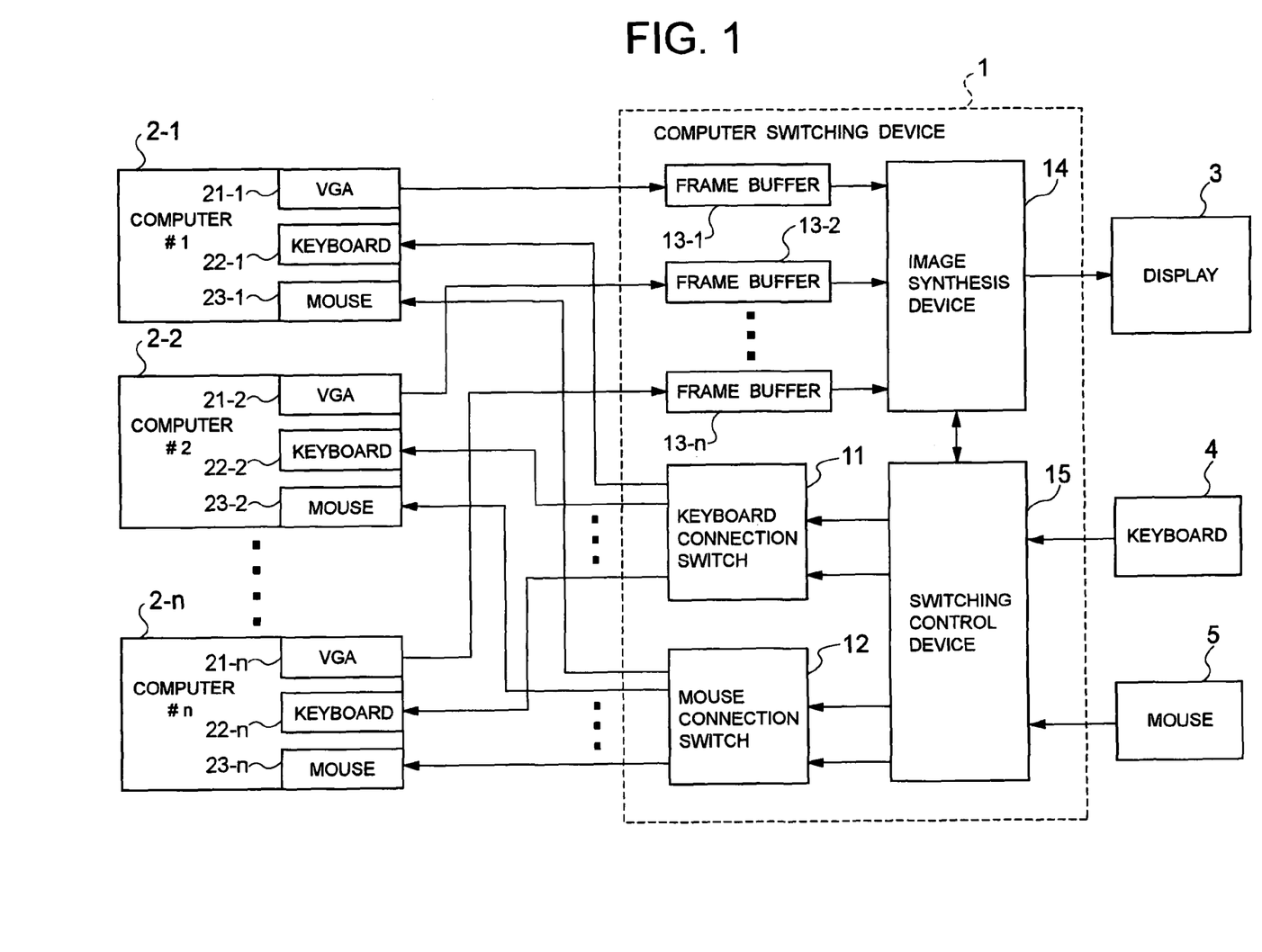
FIG. 1 is a block diagram showing the configuration of a computer system according to one embodiment of the present invention.

The preferred embodiments of the present invention will be described below with reference to the drawings. FIG. 1 is a block diagram showing the configuration of a computer system according to one embodiment of the invention. In FIG. 1, the computer system according to one embodiment of the invention comprises a computer switching device 1, a plurality of computers 2-1 to 2-n (n is a positive integer) connected to the computer switching device 1, one display 3 connected to the computer switching device 1, one keyboard 4, and one mouse 5 connected to the computer switching device 1.

The computer switching device 1 comprises a keyboard connection switch 11 connected to the keyboard interfaces 22-1 to 22-n for the plurality of computers 2-1 to 2-n, a mouse connection switch 12 connected to the mouse interfaces 23-1 to 23-n for the plurality of computers 2-1 to 2-n, the frame buffers 13-1 to 13-n connected to the VGA (Video Graphics Array) outputs 21-1 to 21-n for the plurality of computers 2-1 to 2-n, an image synthesis device 14 and a switching control device 15.

The switching control device 15 receives the operation information of the keyboard 4 and the mouse 5, and transmits the information other than the information required for the switching control to the keyboard connection switch 11 and the mouse connection switch 12. Also, the switching control device 15 instructs the keyboard connection switch 11, the mouse connection switch 12 and the image synthesis device 14 in accordance with the switching control information.

The keyboard connection switch 11 transmits the operation information of the keyboard 4 to a computer that is instructed to transmit the operation information by switching on the computer in accordance with an instruction from the switching control device 15, and does not transmit the operation information to the computer that is instructed not to transmit the operation information by switching off the computer.

The mouse connection switch 12, like the keyboard connection switch 11, switches on or off the computer in accordance with an instruction of the switching control device 15 to transmit the operation information of the mouse 5 or not to transmit it.

The frame buffers 13-1 to 13-n buffer the screens from the VGA outputs 21-1 to 21-n for the computers 2-1 to 2-n, and transfer the buffered screens in accordance with a request from the image synthesis device 14.

The image synthesis device 14 contracts the size of the inputted screen, changes the brightness, moves the position, or synthesizes the images in accordance with an instruction of the switching control device 15, and sends out its processed result to the display 3.

Figure 2:
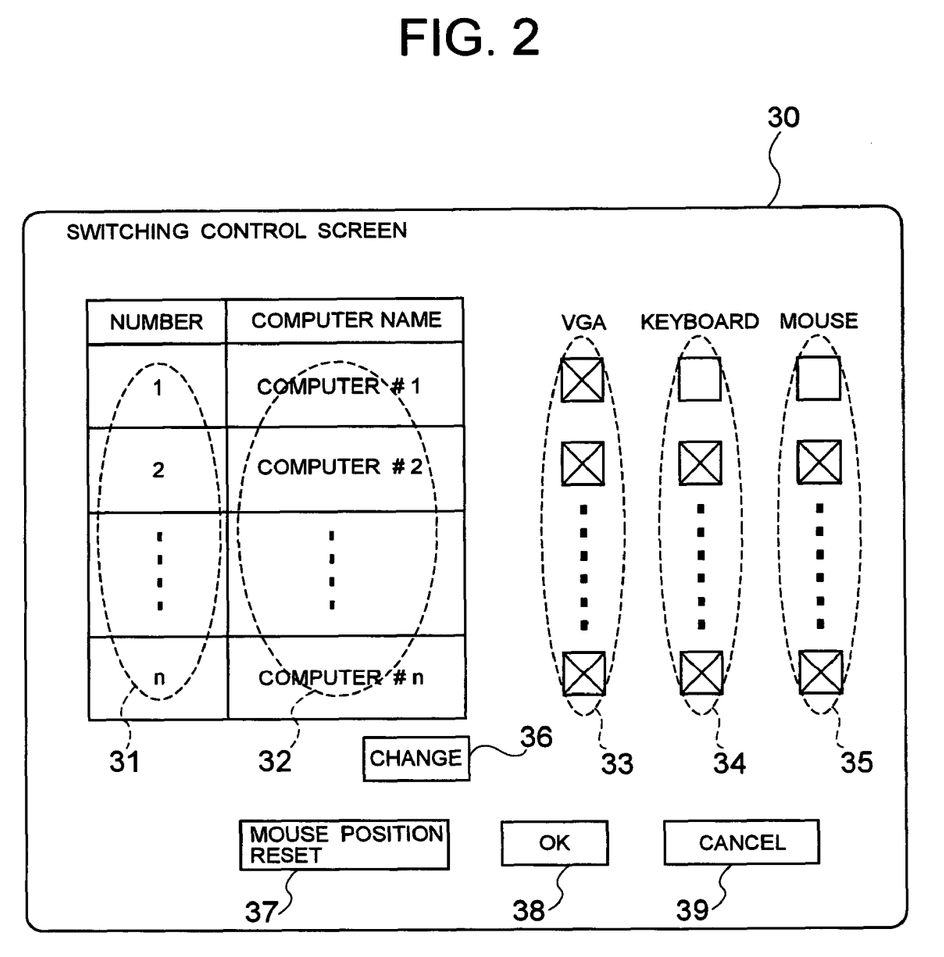
FIG. 2 is a view showing a switching control screen according to one embodiment of the present invention.
Figure 3:
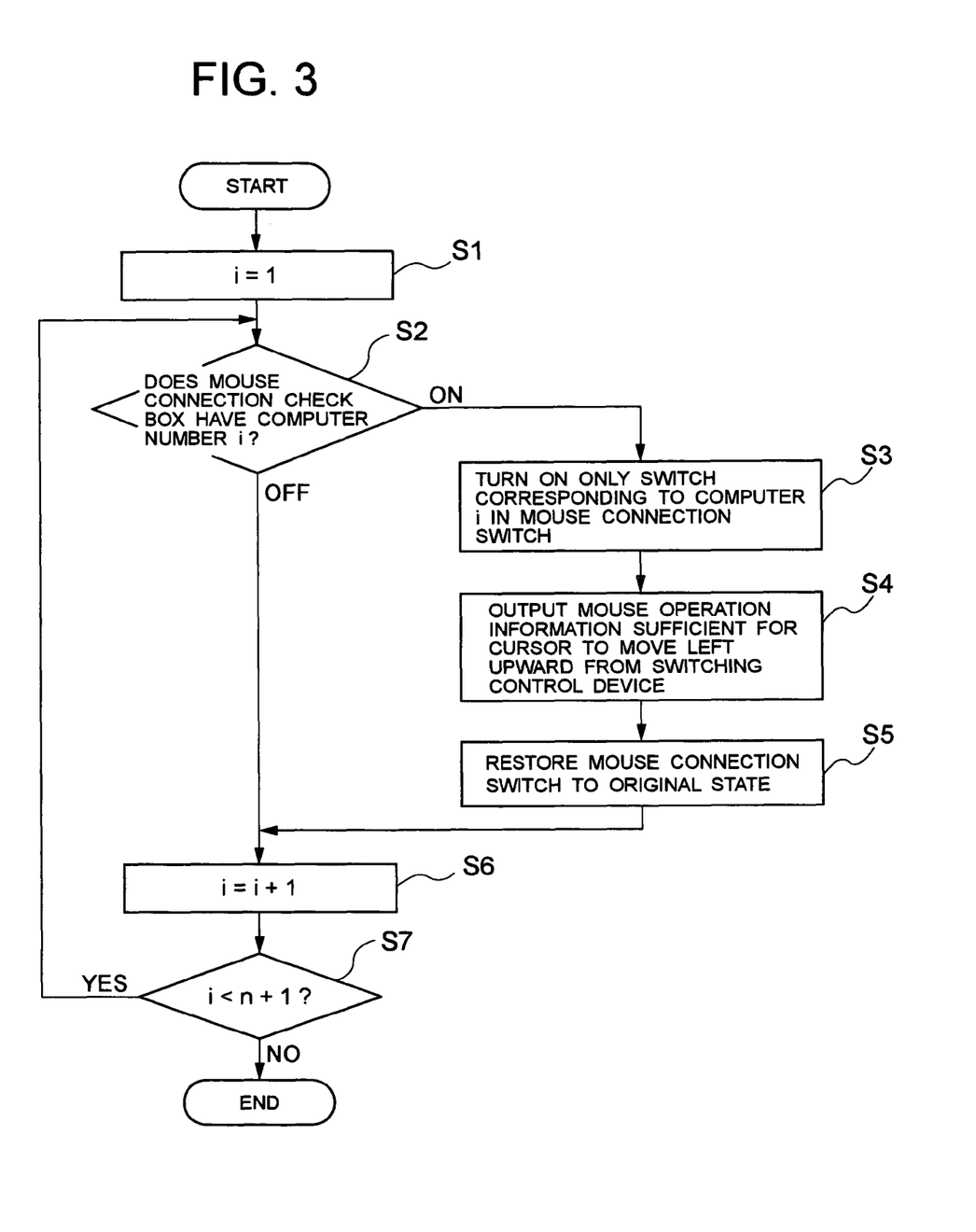
FIG. 3 is a flowchart showing a mouse position reset operation according to one embodiment of the present invention.
Figure 4:
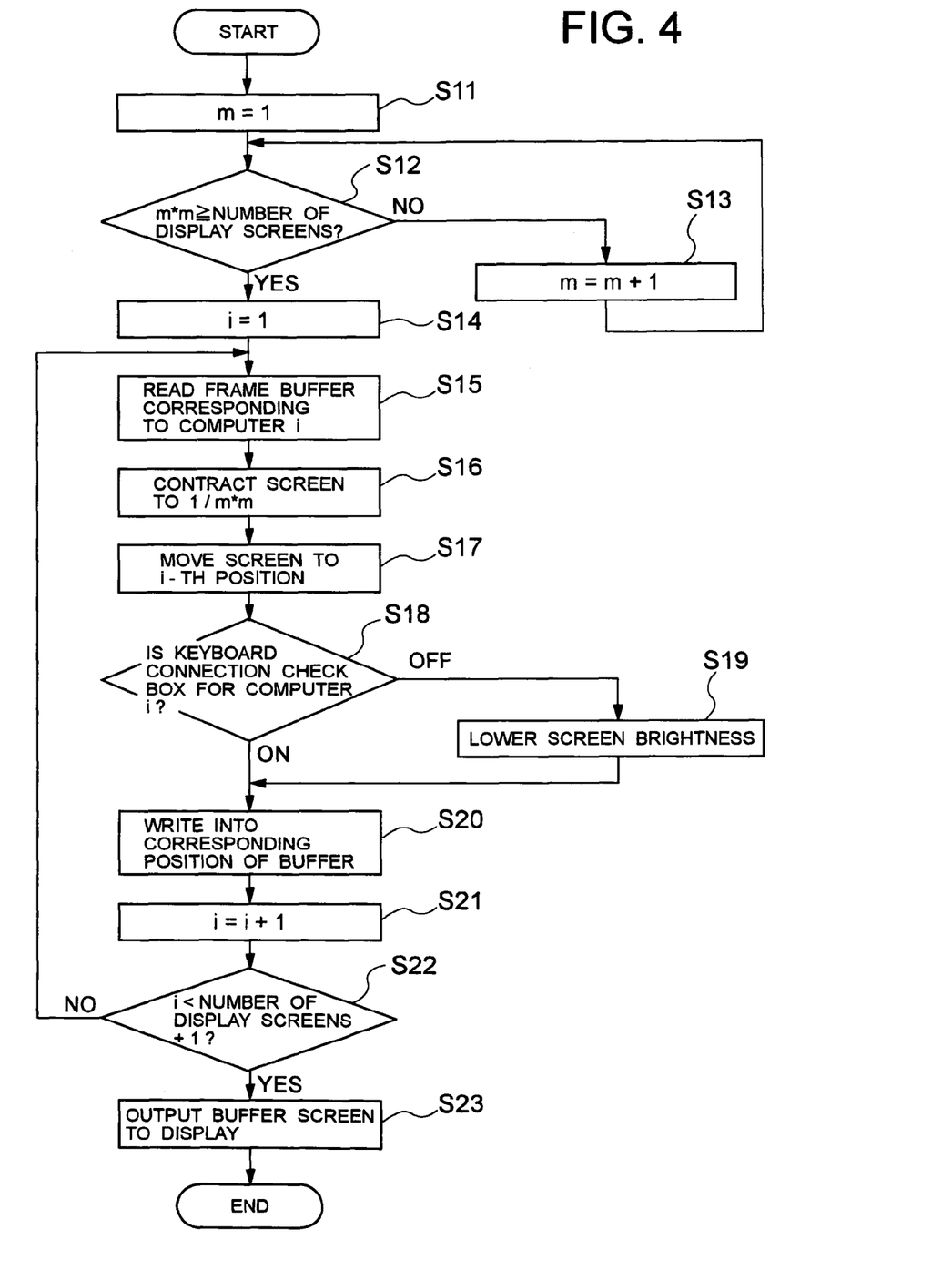
FIG. 4 is a flowchart showing the operation of an image synthesis device of FIG. 1.
Figure 5:
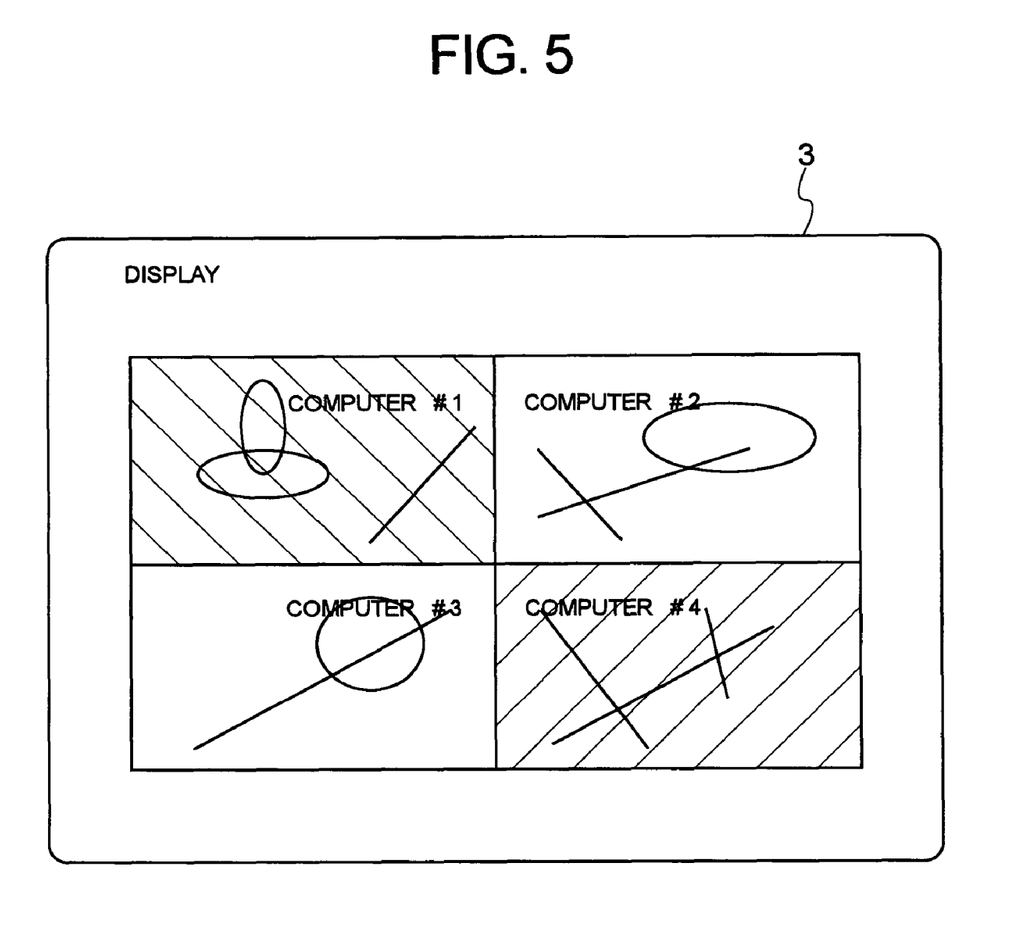
FIG. 5 is a view showing a display screen example on the display of FIG. 1.
Figure 6:
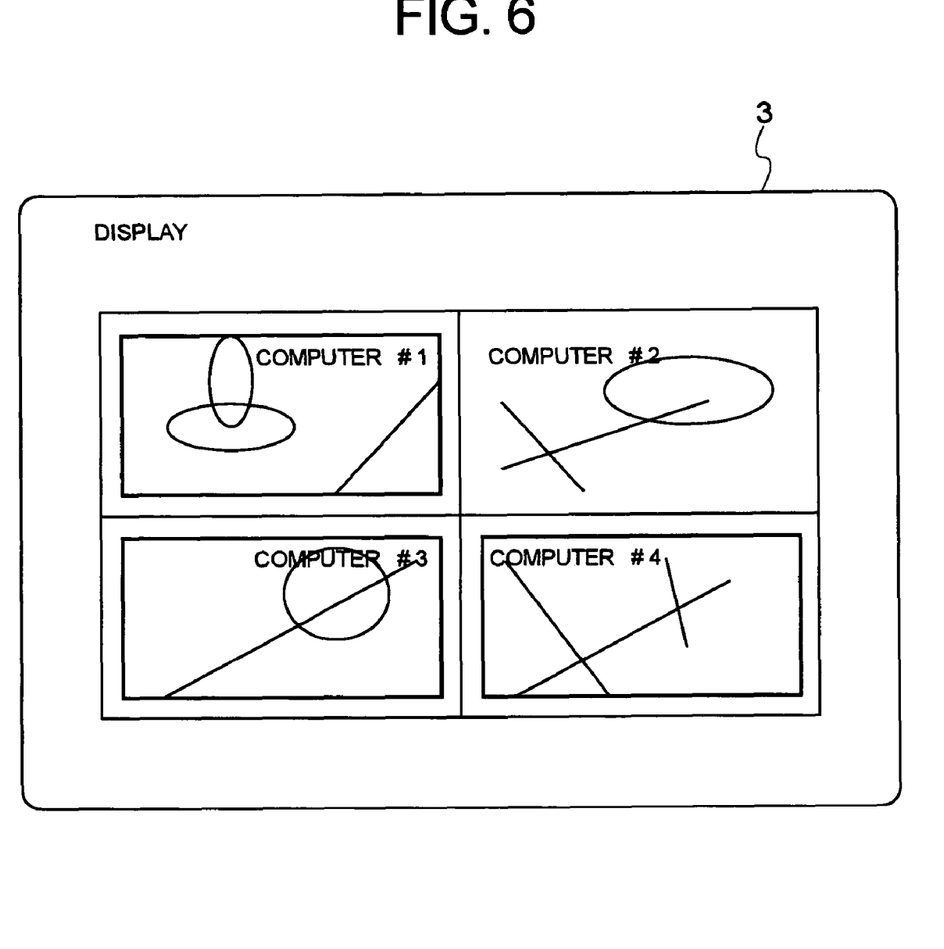
FIG. 6 is a view showing a display screen example on the display of FIG. 1.

FIG. 2 is a view showing a switching control screen according to one embodiment of the invention. FIG. 3 is a flowchart showing a mouse position reset operation according to one embodiment of the invention. FIG. 4 is a flowchart showing an operation of the image synthesis device 14 of FIG. 1. FIGS. 5 and 6 are views showing the display screen examples on the display 3 of FIG. 1. Referring to FIGS. 1 to 6, the operation of the computer system according to one embodiment of the invention will be described below. A process of FIGS. 3 and 4 is implemented by a CPU performing a program in a memory (not shown), if the switching control device 15 and the image synthesis device 14 are constituted by the CPU.

The switching control device 15 usually outputs the operation information of the keyboard 4 and the mouse 5 directly to the keyboard connection switch 11 and the mouse connection switch 12, but interrupts to output the operation information to the keyboard connection switch 11 and the mouse connection switch 12, if a specific key (e.g., Scroll Lock key) of the keyboard 4 is inputted. The switching control device 15 displays the switching control screen 30 on the display 3 through the image synthesis device 14.

A computer number 31, a computer name 32, a VGA display check box 33, a keyboard connection check box 34, a mouse connection check box 35, a computer name change button 36, a mouse position reset button 37, an OK button 38, and a cancel button 39 are displayed on the switching control screen 30. The cursor can be moved between each item by inputting a specific key (e.g., cursor key or Tab key) of the keyboard 4 or clicking on each item with the mouse 5.

The VGA display check box 33, the keyboard connection check box 34 and the mouse connection check box 35 can be switched on or off by inputting a specific key (e.g., space key) of the keyboard 4 or clicking on the check box with the mouse 5 in a state where the cursor is in the check box.

The computer name 32 on the screen is modifiable corresponding to the selected computer by inputting a specific key (e.g., space key) of the keyboard 4 or clicking on the computer name change button 36 with the mouse 5 in a state where the cursor is at the computer name change button 36, so that the computer name 32 can be changed to arbitrary name.

The mouse position reset operation of inputting a specific key (e.g., space key and so on) of the keyboard 4 or clicking the button of the mouse 5 in a state where the cursor is at the mouse position reset button 37 will be described below.

The switching control device 15 sets "1" to a register i, not shown, inside the computer switching device 1 (step S1 of FIG. 3), and checks a state of the mouse connection check box 35 with the computer number i (step S2 of FIG. 3).

When the mouse connection check box 35 is "ON", the switching control device 15 instructs the mouse connection switch 12 to switch on only the computer i (step S3 of FIG. 3), outputs a sufficient amount of mouse operation information to move the cursor to a left upper position on the screen with the resolution of the display of the computer i (step S4 of FIG. 3), and restores the mouse operation switch 12 to its original state (step S5 of FIG. 3).

The switching control device 15 adds "1" to i (step S6 of FIG. 3), and makes a determination whether or not i is smaller than "n+1" (step S7 of FIG. 3). If i is smaller than "n+1", the switching control device 15 goes to a processing at step S2.

The switching control device 15 reads the condition of the VGA display check box 33, the keyboard connection check box 34 and the mouse connection check box 35 by inputting a specific key (e.g., space key and so on) of the keyboard 4 or clicking the button of the mouse 5 in a state where the cursor is at the OK button 38, makes an instruction to the keyboard connection switch 11, the mouse connection switch 12 and the image synthesis device 14, erases the switching control screen 30, and resumes outputting the operation information of the keyboard 4 and the mouse 5.

If the keyboard connection switch 11 receives an instruction of the switching control device 15, then it turns on the switch corresponding to the computer where the keyboard connection check box 34 is on, and turns off the switch corresponding to the computer where the keyboard connection check box 34 is off. The mouse connection switch 12, like the keyboard connection switch 11, turns on the switch corresponding to the computer where the mouse connection check box 35 is on and turns off the switch corresponding to the computer where the mouse connection check box 35 is off.

The switching control device 15 erases the switching control screen 30 without issuing the instruction to the keyboard connection switch 11, the mouse connection switch 12 and the image synthesis device 14, by inputting a specific key (e.g., space key and so on) of the keyboard 4 or clicking the button of the mouse 5 in a state where the cursor is at the cancel button 39, and resumes outputting the operation information of the keyboard 4 and the mouse 5.

Next, the operation of the image synthesis device 14 will be described below. The image synthesis device 14 sets "1" to an internal register m, not shown (step S11 of FIG. 4), and makes a determination whether or not the number of screens instructed from the switching control device 15 is smaller than m*m (step S12 of FIG. 4). If the number of screens is greater than m*m, the image synthesis device 14 adds "1" to m (step S13 of FIG. 4), and the procedure returns to a processing at step S12.

Also, if the number of screens is smaller than or equal to m*m, the image synthesis device 14 sets "1" to an internal register i, not shown (step S14 of FIG. 4), and reads a frame buffer 13-i corresponding to the computer i (step S15 of FIG. 4). The image synthesis device 14 scales down the read screen into one/m*m (step S16 of FIG. 4) and moves the screen to the position corresponding to the i-th screen (step S17 of FIG. 4).

Then, the image synthesis device 14 checks the condition of the keyboard connection check box 35 of the computer i (step S18 of FIG. 4). If the keyboard connection check box 35 is "Off", the brightness of the screen is lowered (step S19 of FIG. 4). The image synthesis device 14 writes the processed screen into a corresponding location of the buffer (not shown) within the image synthesis device 14 (step S20 of FIG. 4).

The image synthesis device 14 adds "1" to i (step S21 of FIG. 4), and makes a determination whether or not i is smaller than "number of display screens +1" (step S22 of FIG. 4). If i is smaller than "number of display screens +1", the image synthesis device 14 returns to a processing at step S15, or otherwise, outputs the synthesized screen to the display 3, as shown in FIG. 5 (step S23 of FIG. 4). The image synthesis device 14 repeats the above operation at a refresh rate of the display 3. FIG. 5 illustrates the difference in the screen brightness between the screen with slant line and the screen without slant line.

In this way, the contents of the VGA outputs 21-1 to 21-n for the plurality of computers 2-1 to 2-n can be displayed on the screen of one display 3 concurrently in this embodiment. Therefore, the plurality of computers 2-1 to 2-n can be easily monitored for errors in this embodiment.

Also, the multicast computers can be easily discriminated by changing the screen brightness between multicast computers and other computers in this embodiment.

Moreover, in this embodiment, since the mouse position is reset, the mouse positions for the plurality of computers 2-1 to 2-n can be aligned, whereby the mouse operation by multicasting can be easily performed.

Also, the screen is scaled down into one/m*m in this embodiment, but may be scaled down without keeping such the aspect ratio as one/m*n. Further, though the screen brightness of the computer where the keyboard connection check box 35 is off is lowered in this embodiment, the screen of the computer where the keyboard connection check box 35 is ON may be framed to clarify the keyboard 4 to be multicast without lowering the brightness, as shown in FIG. 6.

Moreover, the method of lowering the brightness may be applied to the keyboard 4, and the method of framing may be applied to the mouse 5 to clarify both the keyboard 4 and the mouse 5 to be multicast in this embodiment.

Though in this embodiment, one display 3, one keyboard 4, one mouse 5, and one image synthesis device 14 are provided, plural displays 3, keyboards 4, mouses 5 and image synthesis devices 14 may be prepared to make the multiple configuration between the computers 2-1 to 2-n and the computer switching devices 1.

This invention having the above configuration and operation achieves the effect that the plurality of computers can be easily monitored for errors.

What is claimed is:

1. A computer switching device for a computer system composed of a plurality of computers, each of which output a display and receive input from a keyboard and a mouse, said computer switching device comprising:
   means for forming a display screen by synthesizing the display outputs of said plurality of computers;
   means for automatically changing brightness of the display output of each of said plurality of computers simultaneously on the display screen;
   means for setting one or more of the plurality of computers as targets for resetting a cursor position;
   means for determining if a computer of the plurality of computers is set as a target for resetting a cursor position; and
   means for sequentially transmitting arbitrary mouse operation information to only said computers determined to be targets to align cursor positions on the synthesized display outputs for said computers set as targets if the position of the cursor for each computer set as a target is different,
   wherein the brightness of the display output of one or more computers of said plurality of computers receiving input from said keyboard and mouse on said display screen is different from the brightness of the display output of one or more other computers of said plurality of computers, and
   wherein information regarding display resolution of each of said plurality of computers is obtained from a frame buffer corresponding to each of said plurality of computers, and only mouse operation information required to move a cursor to a predetermined position on the display screen with the resolution of the display of each of said computers determined to be targets is transmitted to each of said computers determined to be targets.

2. A computer switching method for use with a computer switching device in a computer system composed of a plurality of computers, each of which output a display and receive input from a keyboard and a mouse, said method comprising:
   synthesizing the display outputs of said plurality of computers with said computer switching device;

displaying the display outputs of said plurality of computers concurrently on a display screen of a display device by contracting and moving said display outputs on said display screen;
automatically changing brightness of the display output of each of said plurality of computers simultaneously, so that the brightness of the display output of one or more computers of said plurality of computers receiving input from said keyboard and mouse on said display screen is different from the brightness of the display output of one or more other computers of said plurality of computers;
setting one or more of the plurality of computers as targets for resetting a cursor position;
determining if a computer of the plurality of computers is set as a target for resetting a cursor position; and
sequentially transmitting arbitrary mouse operation information to only said computers determined to be targets to align cursor positions on the synthesized display outputs for said computers set as targets if the position of the cursor for each computer set as a target is different,
wherein information regarding display resolution of each of said plurality of computers is obtained from a frame buffer corresponding to each of said plurality of computers, and only mouse operation information required to move a cursor to a predetermined position on the display screen with the resolution of the display of each of said computers determined to be targets is transmitted to each of said computers determined to be targets.

* * * * *